United States Patent [19]

Armand et al.

[11] Patent Number: 5,523,180
[45] Date of Patent: Jun. 4, 1996

[54] IONICALLY CONDUCTIVE MATERIAL HAVING A BLOCK COPOLYMER AS THE SOLVENT

[75] Inventors: Michel Armand, St-Martin-D'Uriage; Jean-Yves Sanchez, Saint-Ismiez; Fannie Alloin, Grenoble, all of France

[73] Assignees: Centre National De La Recherche Scientifique, Paris, France; Hydro-Quebec, Montreal, Canada

[21] Appl. No.: 351,312
[22] PCT Filed: Jun. 16, 1992
[86] PCT No.: PCT/FR92/00542
§ 371 Date: Dec. 15, 1994
§ 102(e) Date: Dec. 15, 1994
[87] PCT Pub. No.: WO93/26057
PCT Pub. Date: Dec. 23, 1993

[51] Int. Cl.⁶ .............................. H01M 6/18; C08K 3/00; C08L 53/00
[52] U.S. Cl. .................. 429/188; 429/191; 429/192; 429/198; 524/401; 524/422; 524/423; 252/62.2; 252/518; 525/88
[58] Field of Search .................... 429/191, 192, 429/198; 525/88; 252/62.2, 518; 524/401, 422, 423

[56] References Cited

U.S. PATENT DOCUMENTS 4,752,544  6/1988  Gregory .................... 429/192
5,159,001  10/1992  Motogami et al. ........... 524/157
5,350,646  9/1994  Armand et al. ............. 429/192

FOREIGN PATENT DOCUMENTS 297281  1/1992  Germany .
2229826  9/1990  Japan .
3196408  8/1991  Japan .
8803154  5/1988  WIPO .
WO88/03154  5/1988  WIPO .

OTHER PUBLICATIONS

Derwent Publications Ltd., London, GB; AN 92-175868 & DD,A,297 281 (Technische Hochschule Schorlemmer) Jan. 2, 1992.
Derwent Publications, Ltd., AN 90-323713.
Derwent Publications, Ltd., AN 91-292874.

*Primary Examiner*—Tae Yoon
*Attorney, Agent, or Firm*—Oblon, Spivak, McClelland, Maier & Neustadt

[57] ABSTRACT

An ionically conductive material and its use are described. The material comprises at least one salt dissolved in a polymeric solvent and is characterized in that the polymeric solvent essentially consists of a block copolymer comprising at least one solvating segment (A) and at least one segment (B) having excellent mechanical properties, either intrinsically or once a number of segments (B) have been cross-linked. Said material may be used as an electrolyte in various electrochemical systems.

12 Claims, No Drawings

IONICALLY CONDUCTIVE MATERIAL HAVING A BLOCK COPOLYMER AS THE SOLVENT

The present invention relates to ionically conductive materials and to their uses.

Polymeric electrolytes obtained by dissolving a salt in a solvating polymer containing hetero atoms are known. Such electrolytes in which the solvent is a polyethylene oxide or an ethylene oxide copolymer are described, for example, in EP 13199 (M. Armand, M. Duclot). These polymeric electrolytes have many applications, in particular in the field of electrochemical generators, light-modulating systems (M. Armand et al., EP-87401555) or sensors, for example for selective or reference membranes (A. Hammou et al., FR-86.09602).

Polyethylene oxide is a semicrystalline polymer which forms stoichiometric complexes with salts. The conductive amorphous phases of these complexes exist only above a eutectic temperature which is in general between 40° C. and 65° C. depending on the nature of the complex salts. At normal temperature, good conductivities are obtained only with macromolecular systems exhibiting a low or zero crystallinity. Much work has been carried out to improve the conduction properties of these materials. It has resulted, for example, in the formation of copolymers based on ethylene oxide (M. Armand et al., FR-83.09886). Copolymerization of ethylene oxide with other epoxides such as propylene oxide or methyl glycidyl ether appreciably decreases the crystallinity of the material. However, random introduction of defects is reflected in a marked loss in the solvating and dissociating power of the polyethylene oxide uniform block. The preparation of copolymers which have high macromolecular masses, higher than $10^5$, and which have good mechanical properties requires reactants of high purity and reproducible control of the proportions of comonomers which are introduced is difficult because of the difference in reactivity between ethylene oxide and its homologues Amorphous polymers which have a good conductivity but mediocre mechanical behaviour have been obtained by polycondensation of oligooxyethylene glycols ($M_w \approx 200$–1000) with dichloromethane [C. V. Nicholas, D. J. Wilson, C. Booth & R. J. M. Gilles, Brit. Polym. J., 20, 289 (1988)]. In addition, these materials do not contain reactive functional groups and cannot therefore be crosslinked. In addition, they are easily degraded in acidic medium.

The formation of networks crosslinked with isocyanates is also known (H. Chéradame et al., FR-8007135, U.S. Pat. No. 4,357,401). The introduction of urethane bridges into the electrolytes makes the latter reactive, particularly towards lithium.

The objective of the present invention is to provide ionically conductive materials comprising a solid electrolyte and at the same time exhibiting a good conductivity and a good mechanical behaviour.

To this end, the subject of the invention is an ionically conductive material comprising a salt in solution in a polymeric solid electrolyte.

Another subject of the invention is various uses of the said material.

The ionically conductive material according to the present invention comprises at least one salt dissolved in a polymeric solvent. It is characterized in that the polymeric solvent consists essentially of a block copolymer comprising at least one solvating segment A and at least one segment B which has good intrinsic mechanical properties or which has good mechanical properties after crosslinking between a number of segments B.

The block copolymer constituting the solvent of a material according to the present invention can have various forms. Mention may be made, among the preferred forms, of the diblock copolymer form AB; the triblock copolymer form BAB, in which the two segments B may be identical or different; the triblock copolymer form ABA, in which the two segments A may be identical or different; or the branched polymer form of the type $(AB)_nR$ or $(BA)_nR$, R representing an organic radical having a multiple functionality n.

The segment A of the block copolymer is a solvating segment which gives the material its conductivity properties. The mass of the polymeric segment is preferably between 150 at 20000 and more particularly between 150 and 10000. The segment A consists of units deriving from monomers of the ether, ester or amine type. The segment A preferably results from an ethylene oxide homopolymer or from a statistical copolymer or copolymer with a statistical tendency consisting essentially of ethylene oxide units. Those among the copolymers which comprise at least 70% ethylene oxide units, relative to the total number of monomer units, are particularly preferred. The comonomers are chosen from the monomers which retain the solvating nature of the segment A. Mention may be made, as examples, of propylene oxide, oxymethylene, oxetane, tetrahydrofuran, dioxolane and alkyl glycidyl ethers.

The segment B is intended to confer on the material the mechanical properties required for use of the said material as a solid electrolyte in the form of thin films. These properties are obtained either by the rigidity of the chain constituting the segment B or by the functional groups present on B and which make it possible for the segments B to crosslink to or crystallize with each other. Thus, a segment B can consist of a mainly hydrocarbon radical. Mention may be made, as examples, of a polyene, an alkyl group $C_pH_{2p+1}$, an acyl group $C_{p-1}H_{2p-1}CO$, an alkylaryl group $C_pH_{2p+1}\phi$, an alkylaroyl group $C_{p-1}H_{2p-1}\phi$-CO an alkenyl group $C_pH_{2p-q}$ or an alkenoyl group $C_{p-1}H_{2p-3}CO$, p being an integer which is less than 31 and q being an odd integer which is less than p. The segment B can also result from a polymer containing at least one monomer chosen from styrene, α-methylstyrene and their derivatives, styrene oxide, exo-2,3-epoxynorbornane, phenyl glycidyl ether, epoxy-3-phenoxypropane, ethylene sulphide, allyl glycidyl ether, glycidyl acrylate or methacrylate, epoxyalkenes, furfuryl glycidyl ether, acrylonitrile, methacrylonitrile, ionic acrylates and methacrylates or precursor acrylates and methacrylates of ionic groups corresponding respectively to the formulae below in which X represents an alkyl radical, an alkenyl radical, a metal or a radical —$SiR'_3$,

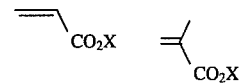

or ionic vinylsulphonates or vinylsulphamates or precursor vinylsulphonates or vinylsulphamates of ionic groups corresponding respectively to the formulae below in which M represents a metal or a radical —$SiR'_3$

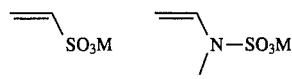

In the two formula groups above, R' represents an alkyl radical having a number of carbon atoms which is less than 6. R' preferably represents a methyl radical.

Particularly preferred epoxyalkenes are butadiene monoxide, 1,2-epoxy-5-hexene and 1,2-epoxy-7-octene.

exo-2,3-Epoxynorbornane, the formula of which is given below, styrene oxide and phenyl glycidyl ether are particularly preferred monomers for the preparation of the segment B.

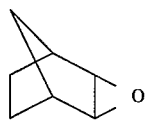

When the block copolymer constituting the solvent of the ionically conductive material of the present invention is a branched polymer of the type $(AB)_nR$ or $(BA)_nR$, R represents an organic radical having from 1 to 10 carbon atoms. The radical R is advantageously a trimethylenemethane radical, a trimethyleneethane radical, a trimethylenepropane radical or a pentaerythrityl radical, the formulae of which are given below in sequence, or a glyceryl radical.

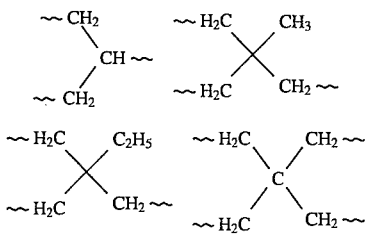

The materials of the present invention are particularly advantageous when the solvent is a branched polymer. In fact, this specific structure of the copolymer makes it possible to simultaneously increase the local concentration of solvating segments at a number of points of the space and the probability of good crosslinking between a number of segments B when the latter have either resulted from crosslinkable monomers or represent a mainly unsaturated hydrocarbon radical. Likewise, the structure of these branched polymers promotes the crystallization between them of the segments B when the latter represent mainly saturated hydrocarbon radicals. These branched copolymers more easily retain the amorphous nature of the segment A which is favourable to the conductivity.

Various processes can be used to prepare the block copolymers, depending on the structure of the desired copolymer and the nature of the monomers chosen.

A process for the preparation of a copolymer of the type AB or of the type BAB consists in first preparing a precursor polymer of the segment A from the appropriate monomer(s). This preparation can be carried out by an anionic or cationic polymerization or by polycondensation, depending on the nature of the reactive functional groups carried by the monomers. It is also possible to use commercially-available polymers such as, for example, polyethylene glycols with masses of 400, 600, 1000, 1500, 2000 or 20,000 supplied by Aldrich. The polymers having a mass of approximately 2000 are particularly preferred. The precursor polymer of the segment A preferably carries reactive end functional groups for the purpose of grafting to the segment B. The segment B is then fixed to the segment A by the appropriate reaction with the reactive functional groups, according to processes known to those skilled in the art.

When the segment B is an essentially hydrocarbon radical such as a polyene, an alkyl group $C_pH_{2p+1}$, an acyl group $C_{p-1}H_{2p-1}CO$, an alkylaryl group $C_pH_{2p+1}\phi$, an alkylaroyl group $C_{p-1}H_{2p-1}\phi$-CO group $C_pH_{2p-q}$ or an alkenoyl group $C_{p-1}H_{2p-3}CO$, it is fixed to A by a condensation reaction via suitable reactive functional groups present at the ends of A.

When the segment B is a radical resulting from a polymer containing at least one monomer, two processes are possible: either the segment B is first prepared by polymerization of the chosen monomer(s) and then the segment B is grafted onto A via suitable reactive functional groups present at the ends of A; or the segment A is brought into contact with the monomer(s) constituting B and a polymerization, either by the anionic route or by the radical route, depending on the reactive functional groups present on A, is initiated. The latter route can also be used when the segment B is a polyene radical.

The reactive ends of the precursor polymer of the segment A can be hydroxyl radicals —OH, amine groups —NHR or carboxyl groups —COOH. These reactive ends, after treatment with a deprotonating base such as NaH, KH, $KOC(CH_3)_3$, KOH or $Na^+$[naphthalene], are used to initiate an anionic polymerization of the reactants constituting B.

If it is desired to carry out a grafting by a radical route, groups which generate free radicals are grafted to the reactive ends of the precursor polymer of the segment A via molecules containing, for example, azo, peroxide or disulphide groups. Mention may be made, among these molecules, of azobis(cyanovaleric) acid, perbenzoic acid or dithiodipropionic acid. These molecules are easily converted to their corresponding esters or amides by reaction with the OH or RNH functional groups of the ends of the precursors of solvating segments A in the presence of molecular dehydrating agents such as, for example, dicyclohexylcarbodiimide, carbonyldiimidazole or succinimidyl carbonate. The thus functionalized precursor of segment A is brought together with the monomers intended to constitute the segment B at the temperature of dissociation to free radicals, preferably at a temperature of between 50° C. and 180° C.

The triblock copolymers BAB' in which B is different from B' can be obtained according to various processes. For example, one of the reactive ends of the precursor polymer of the segment A is protected; the segment B is then grafted via the routes described above and then, after deprotection of the second reactive end, the segment B' is grafted. Another process consists in using a preformed precursor of segment AB' and in then grafting a segment B onto the reactive end of A. It is also possible to use a precursor polymer of segment A which has two different reactive ends.

The monomers which can be used to form the segment B by a radical route are advantageously chosen from styrene, -methylstyrene and their derivatives, acrylonitrile, methacrylonitrile, ionic acrylates and methacrylates or precursor acrylates and methacrylates of ionic groups, or ionic vinylsulphonates or vinylsulphamates or precursor vinylsulphonates or vinylsulphamates of ionic groups.

A process for the preparation of copolymers BA or ABA consists in first preparing a precursor polymer of the segment B by polymerization of the monomer(s) constituting it or else use is made of a precursor of a mainly hydrocarbon radical. The segment(s) A is/are then added. Two processes can be used for this end: either the segment A is first prepared by polymerization of the chosen monomer(s) or else a commercially available polymer such as a polyethylene glycol or an ethylene oxide copolymer is used as segment A and then the segment A is grafted onto B via suitable reactive functional groups present at the ends of B; or the precursor of the segment B, which contains reactive ends, is brought into contact with the monomer(s) constituting A and a polymerization, either by an anionic route or by a cationic route or by polycondensation, depending on the reactive functional groups present on the precursor of the segment B and on the monomers intended to constitute A, is initiated. The block copolymers of the type A'BA, when A is different from A', can be prepared by routes analogous to those which make possible the preparation of the copolymers BAB'.

A process for the preparation of the copolymers of the type $(AB)_nR$ or $(BA)_nR$ consists in reacting the precursor compound of the multi-functionalized group R with the monomer(s) intended to constitute A in order to prepare a branched polymer $A_nR$ or with the monomer(s) intended to constitute B in order to prepare a branched polymer $B_nR$. The segments B or A are then respectively grafted by one of the two routes mentioned previously: preliminary preparation of the segment to be grafted and then grafting; or else bringing the entity $A_nR$ or the entity $B_nR$ into contact with respectively the monomer(s) intended to constitute the segment B or the monomer(s) intended to constitute the segment A.

It is possible that the block copolymers obtained have residual reactive groups. It is preferable to deactivate them by conversion to ether, ester or amide groups with a view to preventing the formation of side reactions during use of the material of the invention.

The materials of the present invention also contain a salt dissolved in the block copolymer. The salt can be chosen from the salts commonly used for ionically conductive solid materials. Mention may be made, by way of examples, of the salts $M^+X^-$, $M^+$ representing $H^+$, a metal cation or an organic cation of the ammonium, amidinium or guanidinium type; X representing an anion with a delocalized electronic charge, for example $Br^-$, $ClO_4^-$, $R_FSO_3^-$ or $(R_FSO_2)_2N^-$, and $R_F$ representing a perfluoroalkyl or perfluoroaryl group. Mixtures of salts can be used.

Various additives can be added to the material of the present invention in order to modify the properties of the final material. Thus, it is possible to incorporate a plasticizing agent such as ethylene carbonate, propylene carbonate, γ-butyrolactone, dimethylformamide, N-methylpyrrolidone, tetraalkylsulphamides, methyl ethers of polyethylene glycols with a mass between 200 and 2000 and, generally, polar molecular derivatives of low volatility. The proportion of these additives can range from 1 to 90% of the total mass.

The ionically conductive materials of the present invention are particularly useful as electrolytes in various electrochemical systems. Mention may be made, by way of examples, of their use as electrolytes in electrochemical generators, in supercapacitors, in electrochromic systems, in light-modulating systems, and for the development of selective membranes or reference membranes in membrane sensors.

EXAMPLE 1

5 ml of 2,2-dimethoxypropane are added to 40 g of commercially-available polyethylene glycol with a mass of 1000 (marketed by Aldrich under the reference 20,242–8). The mixture is then dried in a rotary evaporator at 60° C. in order to remove the residual water from the polymer. While working in a glove box under an inert atmosphere, 5 g of the thus dehydrated polyethylene glycol, in solution in 25 ml of anhydrous THF, are introduced into a receptacle which can be hermetically stoppered and 0.3 g of sodium hydride is added thereto. Cessation of hydrogen evolution indicates that all the end OH groups are metallated. 5 ml of styrene oxide are then added and the mixture is stirred at 55° C. for 6 hours in the closed receptacle. The block polymer obtained is separated by precipitation from a 50/50 ether/hexane mixture.

5 g of the block copolymer obtained and 1.2 g of lithium salt of trifluoromethanesulphonimide are dissolved in acetonitrile. The solution obtained is run onto a substrate and the layer is dried. There is thus obtained a film of a material whose ionic conductivity is $5.10^{-6}$ $(\Omega.\,cm)^{-1}$ at 25° C.

EXAMPLE 2

A solution of 20 g of commercially-available polyethylene glycol with a mass of 2000 (marketed by Aldrich under the reference 29,590–6) in 150 ml of toluene is prepared. The solution obtained is dried by azeotropic dehydration. 5.5 g of palmitoyl chloride and 10 ml of pyridine are then added thereto. The mixture obtained is stirred at normal temperature for 3 hours and the pyridinium hydrochloride precipitate formed is then removed by filtration. The block polymer obtained, which corresponds to the formula $C_{16}H_{33}CO_2(C_2H_4O)_nCOC_{16}H_{33}$, n being of the order of 44, is separated by precipitation from ether. This polymer exists in the form of a wax which melts at 45° C.

5 g of the block copolymer obtained and 1.7 g of lithium salt of trifluoromethanesulphonimide are dissolved in 10 ml of methyl formate. After evaporation of the solvent, a material is obtained whose ionic conductivity is $2.10^{-5}$ $(\Omega.cm)^{-1}$ at 25° C.

EXAMPLE 3

A block copolymer is prepared according to the procedure of Example 2, but replacing palmitoyl chloride with 6 g of linoleyl chloride. The polymer obtained, after complexing with the lithium salt used in Example 2, is mixed with 0.3% by weight of benzoyl peroxide. After shaping by spreading as a film with a thickness of 30 μm, the material is heated at 80° C. for 8 hours. The crosslinked product obtained is a material having both good mechanical properties and a good ionic conductivity [$1.4 \cdot 10^{-5}$ $(\Omega.cm)^{-1}$ at 25° C.].

EXAMPLE 4

60 g of commercially-available polyethylene glycol with a mass of 1500 (marketed by Aldrich under the reference 20,243–6) are dried with 10 ml of 2,2-dimethoxypropane; the excess dehydrating agent and the methanol and acetone formed are removed under reduced pressure. In a glove box under an inert atmosphere, the polymer is dissolved in 300 ml of anhydrous THF and 3.9 g of sodium hydride are then added with stirring. The metallation reaction is complete in 4 hours, which is indicated by the cessation of hydrogen evolution. The mixture is cooled to 0° C. and 40 g of ethylene sulphide are then progressively added while continuing to stir. The receptacle is hermetically closed and polymerization is complete after 2 hours at normal temperature. The polymer obtained is precipitated from ether and purified by washing in isopropanol, dissolving in dichloromethane, centrifuging and reprecipitating from hexane.

EXAMPLE 5

A statistical copolymer of ethylene oxide and of propylene oxide is obtained by cationic initiation with boron trifluoride. 4 g of this copolymer, having a mass of 1600 and containing 15% of propylene oxide units, are metallated under the conditions of Example 1 with 0.6 g of potassium tert-butoxide, in place of sodium hydride. 3.3 g of exo-2,3- epoxynorbornane are added to the reaction mixture and the temperature is maintained at 60° C. for 3 hours. The block copolymer obtained is precipitated with ether and washed by trituration in isopropanol containing 1% of acetic acid and then dried under vacuum at 60° C.

Lithium trifluorosulphonate is dissolved in the block polymer obtained at a concentration corresponding to an oxygen atoms of the solvating segment/Li atoms ratio of 16/1. The ionic conductivity of the material obtained is $1.1 \cdot 10^{-4}$ $(\Omega.\text{cm})^{-1}$ at 44° C.

EXAMPLE 6

70 g of polyethylene glycol with a mass of 2000 (marketed by Aldrich under the reference 29,590–6) are dehydrated according to the procedure of Example 1. 3 g of potassium hydride and then 25 ml of allyl glycidyl ether are added to the solution in THF of the dehydrated polyethylene glycol. The mixture is maintained at 50° C. for 2 hours and the polymer is then precipitated from ether and purified by dissolving in acetone and precipitating from ether, the operation being carried out three times.

A crosslinked membrane is prepared by dissolving the polymer and 1% by weight of benzoyl peroxide in acetone and spreading using a template. After evaporation of the acetone, the polymer is heated at 80° C. for 2 hours under an argon atmosphere. An elastic crosslinked polymer membrane is obtained.

The material becomes ionically conductive after immersion of the membrane in a 1M solution of the lithium salt of trifluoromethanesulphonimide in acetone, the volume of the solution being calculated in order to correspond to an O/Li ratio of 15/1. The membrane obtained has an ionic conductivity of $1.1 \cdot 10^{-4}$ $(\Omega.\text{cm})^{-1}$ at 50° C.

EXAMPLE 7

10 g of α,ω-diaminopoly(oxypropyleneoxyethylene) with a mass of 4000 (Jeffamine® ED 4000, Texaco Corporation) are dissolved in 75 ml of acetonitrile and 15 ml of pyridine. 1.2 g of dicyclohexylcarbodiimide and 0.75 g of azobis(cyanovaleric) acid are added. The mixture is stirred for 9 hours at normal temperature. The dicyclohexylurea precipitate formed is removed by centrifuging and a polyamide is obtained by precipitating from ether. 6 g of this polyamide and 2.7 g of lithium acrylate are dissolved in 30 ml of water and the solution is deoxygenated by sparging with nitrogen and maintained at 70° C. for 2 hours. The acrylate/polyethylene oxide/acrylate block copolymer is precipitated from dioxane and purified by dissolving in a 50/50 by volume ethanol/water mixture and is then reprecipitated from THF.

EXAMPLE 8

80 g of polybutadienediol with a mass of 1000 containing 20% of vinyl groups, 20% of cis-1,4 double bonds and 60% of trans-1,4 double bonds (marketed by Aldrich under the reference 19,079–9) are dissolved in 500 ml of anhydrous THF in a leakproof reactor and 7 g of potassium hydride are added. After the end of the metallation reaction of the OH ends, 180 g of ethylene oxide are progressively added so as to maintain the temperature below 80° C. When the polymerization reaction has ended, 8% by weight of lithium trifluoromethanesulphonate and 0.5% of benzoyl peroxide are added to the copolymer obtained. After spreading this mixture and heating under argon at 110° C. for 2 hours, a crosslinked membrane is obtained which exhibits elasticity. The ionic conductivity is greater than $10^{-4}$ $(\Omega.\text{cm})^{1}$ at 55° C.

EXAMPLE 9

11 g of polyoxyethylene 20 monocetyl ether (Brij 58 of the company ICI) are dried under vacuum at 60° C. and then dissolved in a 50/50 toluene/THF mixture. A naphthalene-sodium solution is added dropwise until the green coloration characteristic of the radical anion $C_{10}H_8^-$ persists and then 4 g of 1,2-epoxy-5-hexene are added. Polymerization by opening of the epoxy ring is carried out over 1 hour at normal temperature. The cetyl-polyethylene oxide-1,2-epoxy-5-hexene block polymer is separated by precipitation from ethyl ether at $-10°$ C. 3 g of this polymer, 1.3 g of the potassium salt of trifluoromethanesulphonimide and 20 mg of cumyl peroxide are dissolved in 10 ml of acetonitrile. After evaporation of the solvent, a film with a thickness of 80 μm is obtained. After heating under nitrogen for 3 hours at 80° C., the material is crosslinked and acquires good mechanical properties. The ionic conductivity is $10^{-5}$ $(\Omega.\text{cm})^{-1}$ at 25° C.

This membrane can be used for the manufacture of electrochromic windows based on Prussian blue $K_xFe(CN)_6$, serving to modulate the light fluxes by application of an electric potential.

We claim:

1. Ionically conductive material comprising a salt dissolved in a solid polymeric solvent, wherein said polymeric solvent consists essentially of a block copolymer comprising at least one solvating segment A and at least one segment B which confers good mechanical properties after crosslinking between a number of segments B, wherein said segment B is selected from the group consisting of a polyene and a polymer of at least one monomer selected from the group consisting of allyl glycidyl ether, glycidyl acrylate, glycidyl methacrylate, epoxyalkenes, furfuryl glycidyl ether, ionic acrylates, ionic methacrylates, precursors of ionic acrylates and ionic methacrylates corresponding respectively to the formulae

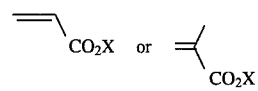

in which X represents an alkyl radical, an alkenyl radical, a metal or a radical —SIR'$_3$, R' being an alkyl radical having less than 6 carbon atoms, ionic vinylsulphamates, ionic vinylsulphonates, precursors of ionic vinylsulphamates or ionic vinylsulphonates corresponding respectively to the formulae

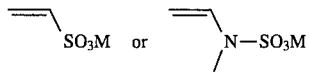

in which M represents a metal or a radical —SIR'$_3$, R' being an alkyl radical having less than 6 carbon atoms.

2. Material according to claim 1, wherein that the block copolymer is a diblock copolymer AB.

3. Material according to claim 1, wherein that the block copolymer is a triblock copolymer BAB, in which the two segments B are identical or different, or a triblock copolymer ABA, in which the two segments A are identical or different.

4. Material according to claim 1, wherein the block copolymer is a branched polymer $(AB)_nR$ or $(BA)_nR$, R representing an organic radical of from 1 to 10 carbon atoms having a multiple functionality n.

5. Material according to claim 1, wherein the segment A comprises ether or amine units.

6. Material according to claim 5, wherein that the segment A is a polyethylene oxide or a statistical copolymer or copolymer with a statistical tendency of ethylene oxide and of at least one comonomer retaining the solvating properties of the segment A.

7. Material according to claim 6, wherein that the comonomer is chosen from propylene oxide, oxymethylene, oxetane, tetrahydrofuran, dioxolane or alkyl glycidyl ethers.

8. Material according to claim 4, wherein that the radical R is a glyceryl radical, a trimethylenemethane radical, a trimethyleneethane radical, a trimethylenepropane radical or a pentaerythrityl radical.

9. Material according to claim 1, wherein the salt is a salt $M^+X^-$, $M^+$ representing $H^+$, a metal cation or an organic cation of an ammonium, amidinium or guanidinium radical; X representing an anion with a delocalized electronic charge, and $R_F$ representing a perfluoroalkyl or perfluoroaryl group.

10. Material according to claim 1, wherein the segment B is of additionally at least one unit selected from the group consisting of styrene oxide, exo-2,3-epoxynorbornane, phenyl glycidyl ether, epoxy-3-phenoxypropane ethylene sulphide, acrylonitrile and methacrylonitrile.

11. Material according to claim 9, wherein X is $Br^-$, $ClO_4^-$, $R_FSO_3^-$ or $(R_FSO_2)_2N$, wherein $R_F$ is as defined in claim 13.

12. An electrochemical generator, supercapacitors, electrochromic system, light modulating system, selective membrane or membrane sensor, comprising, as an electrolyte, the material according to claim 1.

* * * * *